United States Patent Office 2,842,736
Patented July 8, 1958

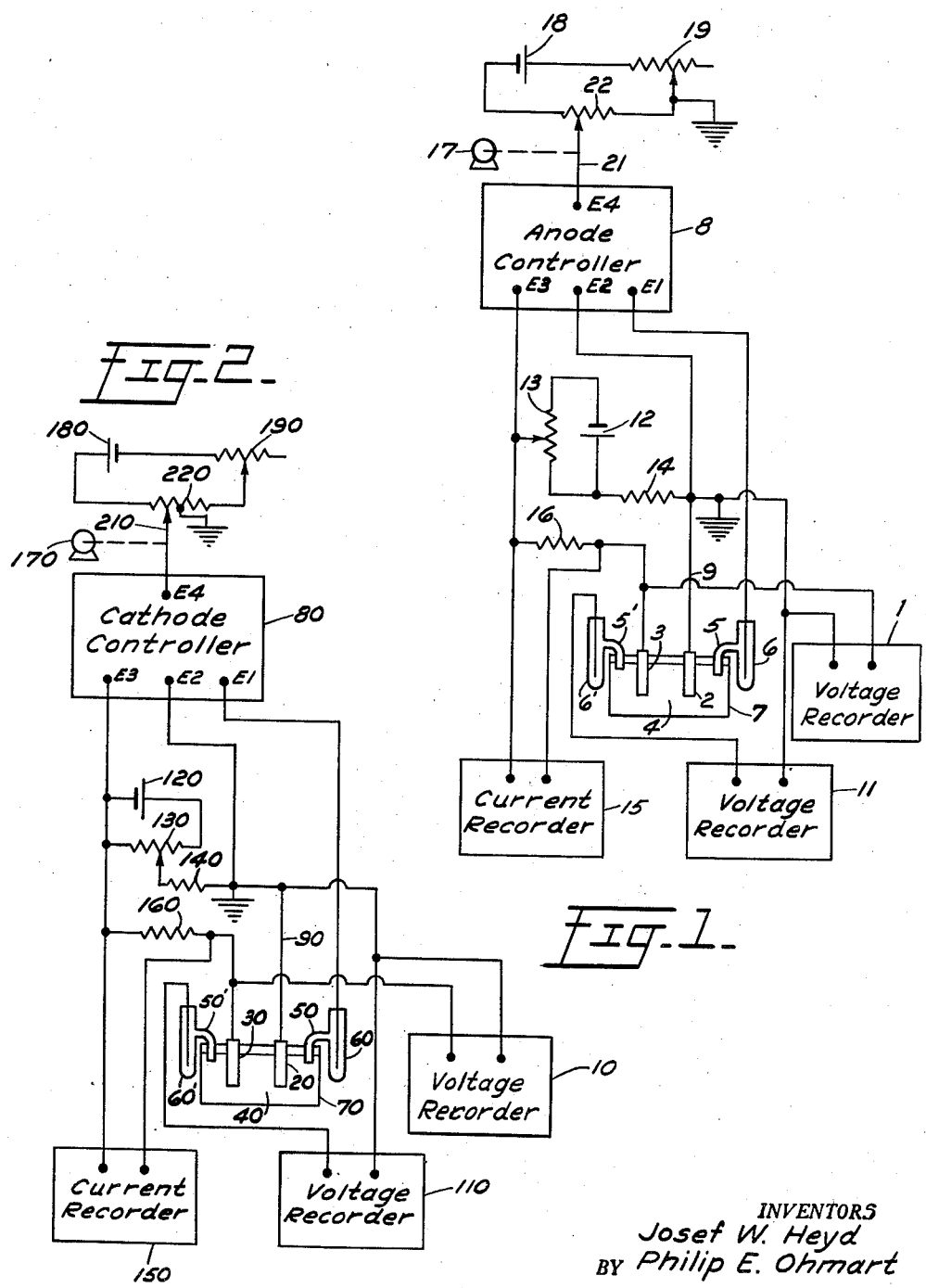

2,842,736
POLAROGRAPH

Josef W. Heyd, Dayton, and Philip E. Ohmart, Cincinnati, Ohio, assignors to the United States of America as represented by the United States Atomic Energy Commission Application April 7, 1954, Serial No. 421,715

3 Claims. (Cl. 324—30)

Our invention relates to a method and apparatus for the measurement of electrochemical potentials. More particularly it pertains to polarography with inert electrodes for determination of oxidation-reduction potentials, and is especially valuable in the study of ions reducible at potentials more positive than mercury.

The oxidation-reduction potential is the potential an unattackable metal electrode assumes in a solution relative to that of the normal hydrogen electrode. That potential is normally measured with a standard electrode such as calomel and a platinum or gold metallic electrode. The potential between electrodes may be measured by a potentiometer graduated in millivolts, or in units of $E_h$ or $R_h$. The polarograph may be used for the measurement of such potentials in many cases. The voltage between electrodes may be raised slowly, and a plot of current through the cell vs. applied voltage is recorded. The current will remain substantially constant until the reduction point of a component of the solution in the cell is reached. Then the current will rise sharply to a new constant value. Therefore, the position of the step in the plotted curve will indicate accurately the reduction potential of the element or ion in solution.

We have noted that when an inert anode electrode is used in the polarographic cell, rather than a mercury-dropping electrode, the conventional polarograph does not give accurate results. We have determined that the errors result because continuous control of the cathode potential is not possible, since merely increasing the voltage between the anode and cathode in the conventional manner will change the potential of the inert anode at first, before it alters the cathode potential. This change continues until the anode attains a reasonably constant potential, at which time the cathode potential will begin to change. Thus, with a conventional polarograph, the reference electrode (anode) changes in potential, and also the total applied change in potential is not impressed upon the cathode, thus compounding the errors produced.

Other effects tend to reduce the accuracy of conventional polarographic equipment. Perhaps the most serious of these is that it takes considerable time to plot the point-to-point polarographic curve, during the steps of adjusting the voltage, reading the proper meters, taking data, and actually plotting the curve. During the course of obtaining a polarogram a sheath tends to build up on the inert electrode, producing a counter-E. M. F. which will destroy the accuracy of the results unless it is properly compensated. In addition, polarization at the cathode tends to alter cathode potential with changes in solution current, since the polarization voltage is a function of current.

With the knowledge of the defects of the systems of the prior art, we have as a primary object of our invention, provision of an improved method and apparatus for polarography whereby the single electrode potential of one electrode may be continuously varied, without change in the potential of the other electrode.

Another object of our invention is to provide accurate rapid compensation for the change in cathode potential due to polarization.

Yet another object of our invention is to provide for a substantial reduction in time required to obtain a polarogram by providing a continuously varying cell voltage in continuous recording of the cell current and voltage, as contrasted with the prior point-to-point method, whereby no sheath is formed on the anode and no appreciable counter-E. M. F. is operated.

A fundamental object of our invention is to provide an automatic polarograph of greatly increased precision.

Other objects and advantages of our invention will become apparent from the following detailed description of a preferred embodiment thereof, when read in conjunction with the appended drawings, in which:

Figure 1 represents in block form a polarographic cell with associated control, measuring, and recording apparatus arranged according to the teachings of our invention to perform an anode sweep;

Figure 2 represents a similar system arranged to provide a cathode sweep; and

Figure 3:
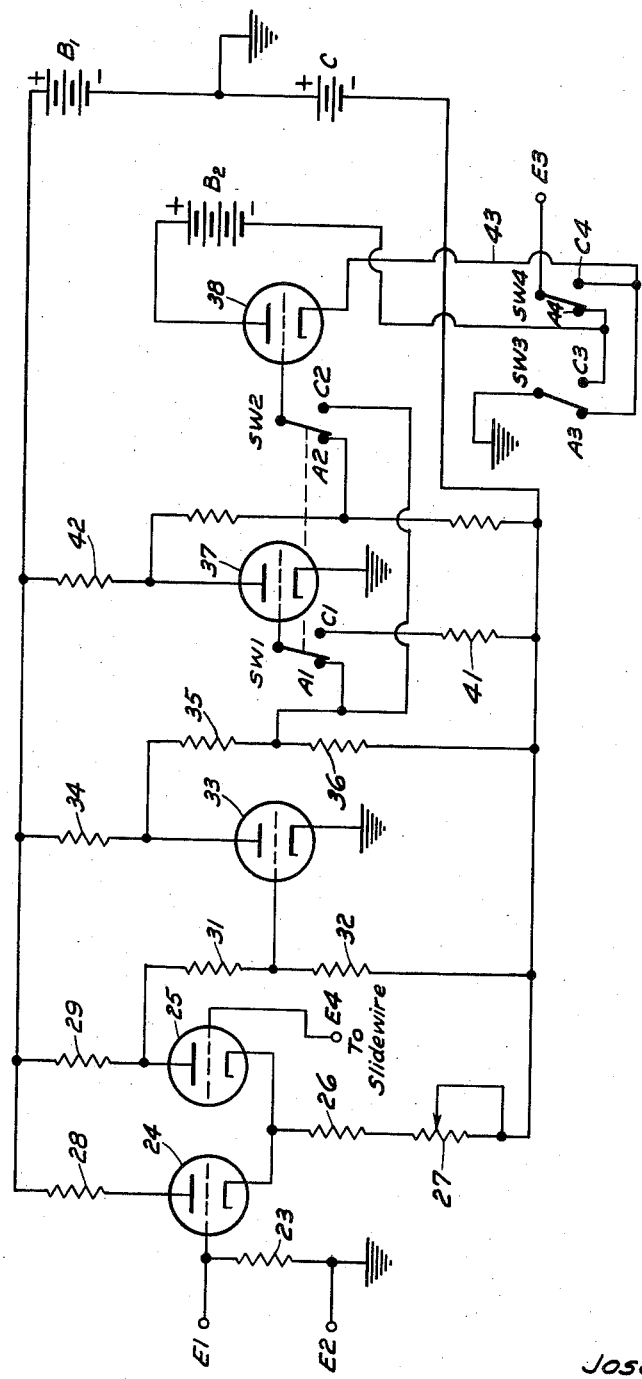
Figure 3 illustrates a schematic circuit diagram of the control apparatus shown in block form in Figures 1 and 2 especially adapted for use by both anode and cathode sweeps.

Referring now to Figure 1, a conventional polarographic cell may be utilized, comprising simply a glass beaker 7 containing a grounded inert electrode 2 and a small inert electrode 3, which may be, for example, platinum. The solution 4 to be electrolyzed contacts both the electrodes and also a pair of salt bridges 5, 5'. The bridge 5 connects the solution to a reference half cell 6, which may be calomel or silver-silver chloride, and which connects to the input terminal E1 of controller 8, shown in detail in Figure 3. The "polarographic" electrode 2 is maintained at ground potential by the direct connection 9, as is one input terminal E2 of controller 8, so that the potential difference appearing between the input terminals E1—E2 of the controller will always equal the algebraic sum of the electrode-solution potential plus the half-cell potential of the reference cell 6. That is, since the electrode 2 is grounded, the reference cell-to-ground potential is the algebraic sum of the polarographic electrode-to-solution potential and the half-cell potential of cell 6. A voltage recorder 11, which may be a conventional high impedance device such as those available from the Leeds and Northrup Company, may be connected across the terminals E1—E2 to measure, indicate, and record the electrode-to-solution potential. Preferably, however, a second half-cell 6' and salt bridge 5' are utilized to derive the solution potential, which is coupled to the ungrounded input lead of recorder 11. A battery 12 shunted by potentiometer 13, and having its positive terminal connected to ground through current limiting resistor 14 is provided as a source of bias. The arm of potentiometer 13 may be adjusted so as to insure a linear variation of current through a dummy load over a maximum range of sweep voltage. Resistor 16 is coupled between the movable arm of potentiometer 13 and the electrical lead connected to anode 3, to serve as a current shunt for current recorder 15, which may be a conventional millivolt recorder. A high impedance recorder 1 may be connected between electrodes 2, 3 to measure the anode-cathode potential of the cell.

Input terminal E4 of the controller 8 is coupled to the movable arm 21 of a motor-driven slidewire 22. A battery 18 or other potential source is coupled to the slidewire through variable resistor 19. The movable resistor arm is grounded and coupled to one end of the slidewire, while the negative battery terminal connects to the opposite end of the slidewire. The motor 17 driving slidewire arm 21 may be operated in either direction to provide an anode sweep voltage for varying the potential at input terminal E4. Battery 18 is preferably a 4.5 volt cell to provide sufficient voltage for a sweep range of 0 to —3 volts. The bias from battery 12 and resistors 13 and 14 may be 1.5 volts, for example, while, resistor 14 may be 2000 ohms.

Referring now to Figure 2, the apparatus shown in Figure 1 is shown connected to provide a cathode sweep voltage. Cell 70 comprises electrodes 20 and 30 disposed in solution 40, and is provided with a pair of half-cells 60, 60' connected to the solution through salt bridges 50, 50'. Current shunt resistor 160 is provided in the energizing circuit for electrode 30 to provide a voltage drop for current recorder 150, while voltage recorder 110 is coupled to cell 60' and to ground. Anode-cathode potential recorder 10 is connected between the electrodes. Electrode 20 is grounded through lead 90 and connected to input terminal E2 of controller 80, reference cell 60 is coupled to input terminal E1, and electrode 30 is coupled to output terminal E3. The negative terminal of bias source 120 is coupled directly to terminal E3, while the positive terminal is coupled through parallel resistor 130 and through limiting resistor 140 to ground. It will be noted that the bias battery connection differs from that in the anode controller of Figure 1.

Slidewire 220 is energized by battery 180 which is connected is series therewith through voltage sweep range adjustment resistor 190. A tap on slidewire 220 is grounded so that the movable arm 210 may assume a potential either below or above ground and the potential or electrode 30 may correspondingly vary above or below ground potential.

Referring now to Figure 3, a preferred electrical circuit suitable for use alternatively as an anode or cathode controller is shown schematically. A pair of input terminals E1 and E2, connected by input resistor 23, receive the input signal and apply it to the grid of tube 24. Tubes 24 and 25 are connected as a difference amplifier having common cathode resistors 26, 27 connected to a source of negative voltage indicated C— and energized from a common source of potential indicated $B_1^+$ through load resistors 28, 29. The grid of tube 24 is connected to the input terminal E1, while the grid of tube 25 is connected to the movable arm of the motor driven slidewire illustrated in Figures 1 and 2. The slidewire is energized by a battery or other suitable source of potential, as illustrated. An output lead is coupled from the anode of tube 25 through divider network 31, 32 to the grid of tube 33. The cathode of this tube is grounded, its grid is returned to the negative supply C— through resistor 32, and its anode is coupled to the voltage source B+ through load resistor 34. An output is taken from the anode of tube 33 through voltage divider 35, 36 and coupled to the switch terminals A1 and C2, which may be coupled respectively to the grids of tubes 37, 38 by means of switches SW1 and SW2. The switch arms are preferably coupled together so that both switches are thrown simultaneously, alternatively connecting terminals A1, A2 or C1, C2 to the grids of tubes 37, 38. The anode of tube 37 is coupled to the source B+ through resistor 42, its grid is returned to the source C— through either resistor 36 or resistor 41 and its cathode is connected to ground. Tube 38 is energized through potential source $B_2^+$ and has its cathode returned through lead 43 to contacts C4 and A3 of switches SW4 and SW3. Contacts C3 and A4 are coupled to the negative side of source B2, while the movable arms of switches SW3 and SW4 are connected to ground and to output terminal E3, respectively. Thus, with the switches all thrown to the "A" positions, inverter tube 37 is in the circuit, cathode lead 43 is grounded, and platinum electrode 3 (Figure 1) and output terminal E3 are coupled to the negative side of source B2. With the switches thrown to the "C" position, tube 37 is by-passed, the negative side of source B2 is grounded, and cathode lead 43 is connected to terminal E3.

In operation of our invention for anodic disposition, the motor 17 driving slidewire arm 21 is energized with the arm at the most positive position of the slidewire. The arm will move toward the more negative end of the slidewire, causing the potential of the grid of tube 25 to fall gradually and uniformly. As the grid voltage falls, less current will flow through the tube 25, causing the voltage drop to decrease across the anode resistor 29, and raising the potential at the grid of tube 33. The current through tube 33 increases and its anode potential falls, gradually decreasing the potential at the grid of tube 37 and causing the current therethrough to decrease slowly and uniformly. The potential applied to the grid of tube 38 thus rises uniformly, increasing the current therethrough. Since the cathode of tube 38 is returned to ground through contact A3, and electrode 2 is also grounded, all the current through the tube 38 must flow through the solution 4 in returning from ground through the supply source B2 to the tube anode. The voltage recorder 11 is a very high impedance device so that substantially no current is diverted through that path. As the current through the tube 38 and the solution increases, the change in magnitude will be recorded by current recorder 15. The potential of the electrode 3 will increase uniformly, because of the increased IR drop in the solution, but the potential of electrode 2 will remain constant, because of the ground connection. Any change in electrode-solution potential due to polarization at the electrode 2 will appear as a voltage change across the input resistor 23, and will change the current through tube 24, thus altering the current through tube 25 and eventually through tube 38 in such proportion as to leave the anode-cathode potential of the cell unaffected. Cell 12 and associated potentiometer 13 provide a bias voltage to insure linearity of polarographic current vs. sweep voltage over a wide range of sweep voltages.

In operation of our invention for cathodic deposition, all four switches SW1—SW4 are thrown to the "C" position. The motor 17 is energized to move arm 21 in the desired direction, either positive or negative with respect to ground. Assuming movement in the positive direction, the input potential to the grid of tube 25 will rise, causing a drop in potential at the grid of tube 33 and a rise in potential at the grid of tube 38. Tube 37 is cut out of the circuit, and electrode 3 is coupled to lead 43. Electrode 2 is grounded, as is the negative side of the power supply B2 for tube 38, through contact C3. Conduction will increase through tube 38, and this current will flow through the solution 4, causing an increased IR drop between electrodes 2 and 3. Since electrode 2 is grounded, the potential of electrode 3 must rise continuously. Any change in electrode-solution potential due to polarization at electrode 2 will appear as a voltage change across resistor 23, thus changing the current through tube 38 proportionally to compensate for the polarization so that the anode-cathode potential rise will remain uniform.

Since the only time required for the obtaining of the complete polarogram is that required for the motor to drive the arm 21 across the potentiometer 22, it will be apparent that we have provided a method by which the point-to-point method of obtaining current and voltage step wise is vastly improved. The greatly increased speed of obtaining the polarogram makes it possible for the first time to achieve accurate results not put in error by the formation of a sheath around the inert anode, since no appreciable sheath will form during the taking of a polarogram by our novel method.

It will also be apparent to those skilled in the art that we have for the first time accomplished the continuous derivation of anode to cathode potential in polarography while maintaining the potential of one of the electrodes constant and while providing effectively for compensation both for electrode polarization and for the change in polarization voltage due to changes in solution current.

The measurements of currents and voltages by recorders as indicated could, of course, be made manually with galvanometers and potentiometers or other means known to the art. It is apparent that our invention is not limited to the preferred embodiments and component values herein illustrated but only by the scope of the appended claims, it being obvious that changes in circuit components and values could be made by those skilled in the art without departing from the spirit of our invention.

Having thus described our invention, what is claimed is:

1. An improved polarograph for deriving the controlled electrode-solution potential and the current through an electrolytic solution comprising a reaction vessel, an electrolytic solution therein, a first electrode and a second controlled electrode contacting said solution, means connecting said controlled electrode to a point of reference potential, a source of current coupled to said electrodes to energize the same, a half-cell in electrical communication with said solution, an impedance coupled to said half-cell and to said reference point, whereby a current may traverse said impedance, means for deriving a continuously variable potential, means responsive to the current through said impedance and to said continuously variable potential for continuously varying the potential of the second electrode, and means for measuring the current through said solution and the potential between said solution and said controlled electrode.

2. An improved polarograph for measuring the controlled electrode-solution potential and the solution current between two immersed electrodes comprising a reaction vessel, an electrolytic solution therein, a first electrode and a second controlled electrode contacting said solution, means connecting said controlled electrode to a point of reference potential, a half-cell in electrical communication with said solution, an impedance coupled between said half-cell and said reference point, a difference amplifier having first and second input circuits and an output circuit associated therewith, said impedance being connected in said first input circuit, a source of potential connected to said reference point, means for deriving a continuously variable potential from said source and connected to said second input circuit, and output driver stage having input and output circuits associated therewith, means for selectively coupling the output circuit of said driver stage to one of said electrodes, means coupling the input circuit of said driver stage to the output circuit of said difference amplifier for varying the current flow through said stage to the selected immersed electrode, means for measuring the amount of current flow between said electrodes, and means for measuring the potential between said controlled electrode and said solution.

3. An improved polarograph for recording the current flow between a pair of inert electrodes in solution and the polarographic electrode-solution potential, and providing improved means for continuously varying the potential of one electrode while maintaining that of the other electrode substantially constant and for compensating for polarization effects, comprising a reaction vessel, a solution disposed therein, first and second electrodes contacting said solution, a reference half cell, a salt bridge immersed in said solution and connected to said half cell, a point of constant reference potential, an impedance connecting said half cell to said reference point, an electrical connection between said polarographic electrode and said point, an electric discharge device, having at least anode, grid, and cathode electrodes, a current source for energizing said device, means for coupling the cathode of said device to either electrode immersed in said solution, means for deriving a continuously varying potential, means for electrically combining said potential with the potential developed across said impedance, means for applying said combined signals to the grid of said device to control the current therethrough and through said solution, and means for measuring and recording continuously the polarographic electrode-solution voltage and the current through said solution.

References Cited in the file of this patent

UNITED STATES PATENTS

| | | |
|---|---|---|
| 2,246,981 | Matheson et al. | June 24, 1941 |
| 2,560,857 | Gambetta | July 17, 1951 |
| 2,618,674 | Stanton | Nov. 18, 1952 |